United States Patent [19]

Amicel et al.

[11] 4,179,380

[45] Dec. 18, 1979

[54] HOLLOW FIBRE APPARATUS

[75] Inventors: Charles Amicel, Carrieres sur Seine; Bernard Biot, Craponne; Yves Butruille, Ferrol-Attilly; Christian Ollivier, Vienne, all of France

[73] Assignee: Sodip S.A., Meyzieu, France

[21] Appl. No.: 865,097

[22] Filed: Dec. 27, 1977

[51] Int. Cl.$^2$ .............................................. B01D 31/00
[52] U.S. Cl. .................. 210/321 A; 55/158;
  210/321 B; 210/450; 210/456; 422/48
[58] Field of Search ................ 210/22, 321 R, 321 B,
  210/321 A, 456, 450; 422/48; 55/16, 158

[56] References Cited

U.S. PATENT DOCUMENTS

| 3,536,611 | 10/1970 | DeFilippi et al. ................ 210/22 |
| 3,704,223 | 11/1972 | Dietzsch et al. ............ 210/321 B X |
| 4,045,851 | 9/1977 | Ashare et al. ................ 210/321 R X |

FOREIGN PATENT DOCUMENTS

| 2542438 | 3/1977 | Fed. Rep. of Germany ...... 210/321 R |
| 47-49984 | 12/1972 | Japan ..................................... 210/321 R |
| 523699 | 11/1976 | U.S.S.R. ............................. 210/321 R |

Primary Examiner—Frank A. Spear, Jr.

Attorney, Agent, or Firm—Gerald D. Sharkin; Robert S. Honor; Walter F. Jewell

[57] ABSTRACT

The invention concerns hollow fibre apparatus for the fractionation of fluids which comprises, a mandrel towards the ends of which two sealing elements are situated which surround the said mandrel and by which the hollow fibres are held, the fibres extending from one sealing element to the other, at least one of these sealing elements being traversed by the hollow fibres so that open ends thereof are exposed at an outer side thereof and having an inner side opposite to the inner side of the other sealing element which is inclined at least in part with respect to the longitudinal axis of the mandrel, a casing which is arranged at least around the hollow fibres and the sealing elements and which defines, between its inner wall, the inner sides of the sealing elements and the mandrel, a chamber in which the hollow fibres are arranged, first inlet and/or outlet means for introducing and/or withdrawing fluid which is circulated inside the hollow fibres, and second inlet and outlet means for introducing and withdrawing of fluid which is circulated outside the fibres inside the chamber.

15 Claims, 10 Drawing Figures

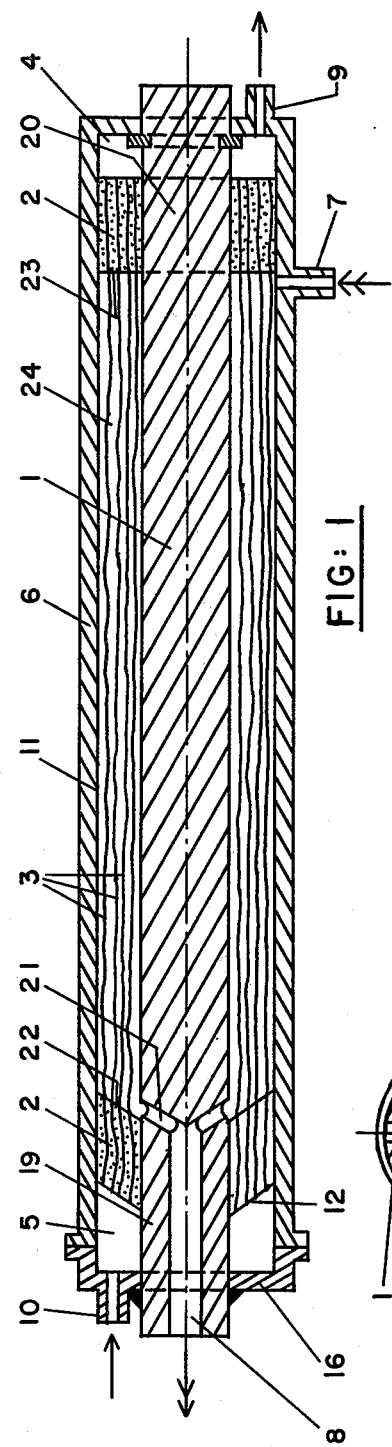
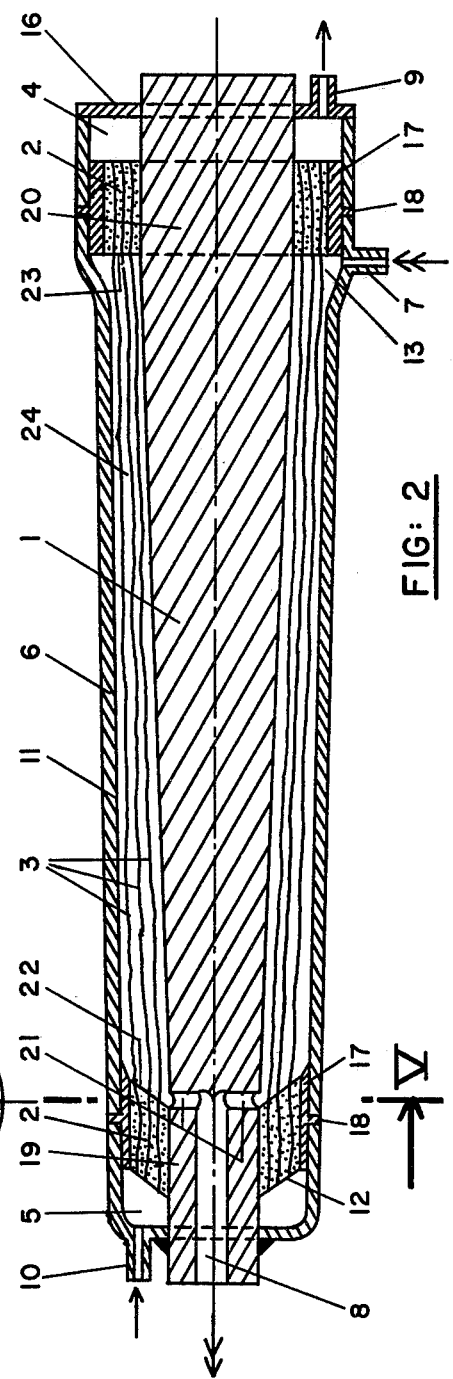

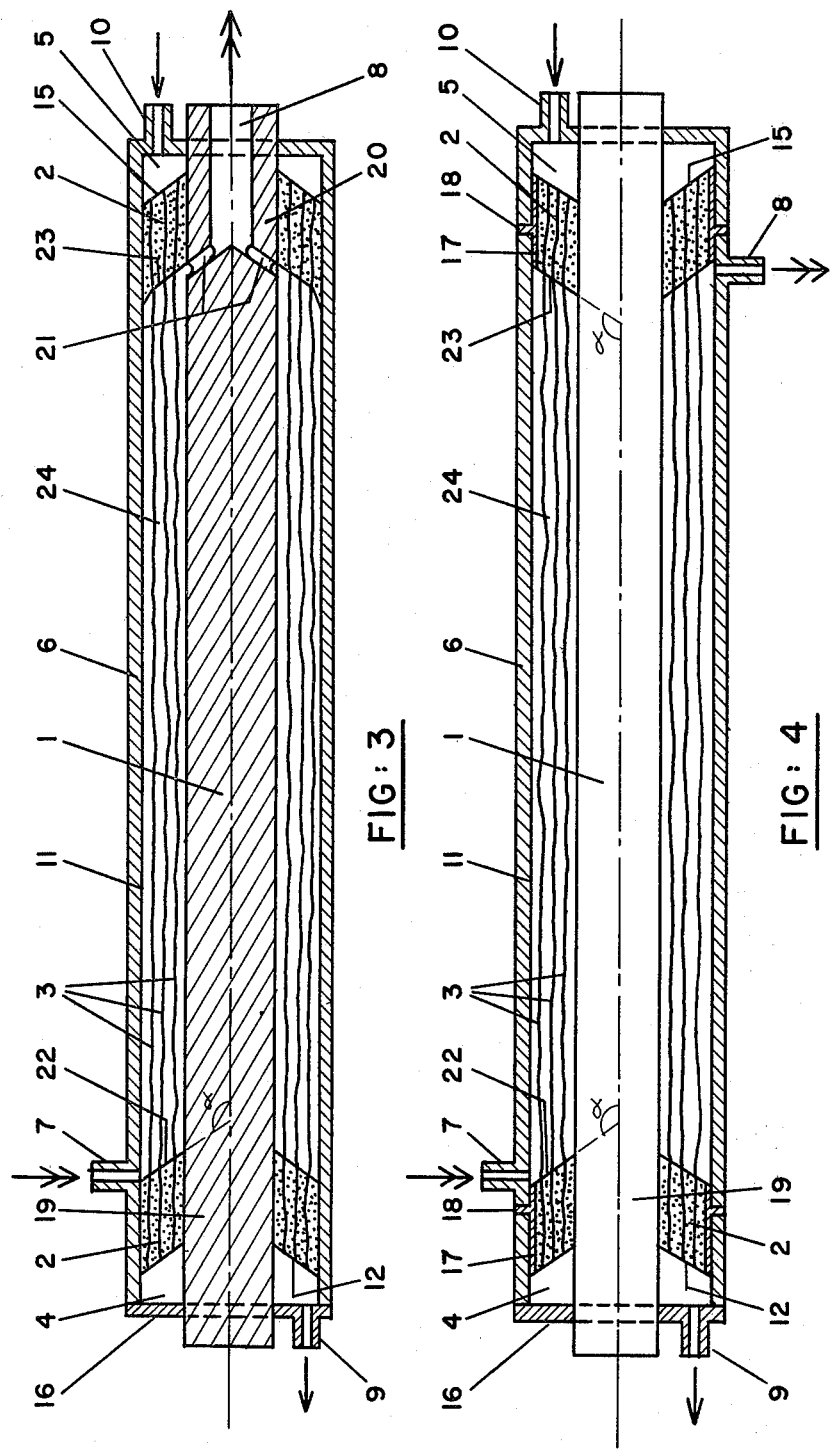

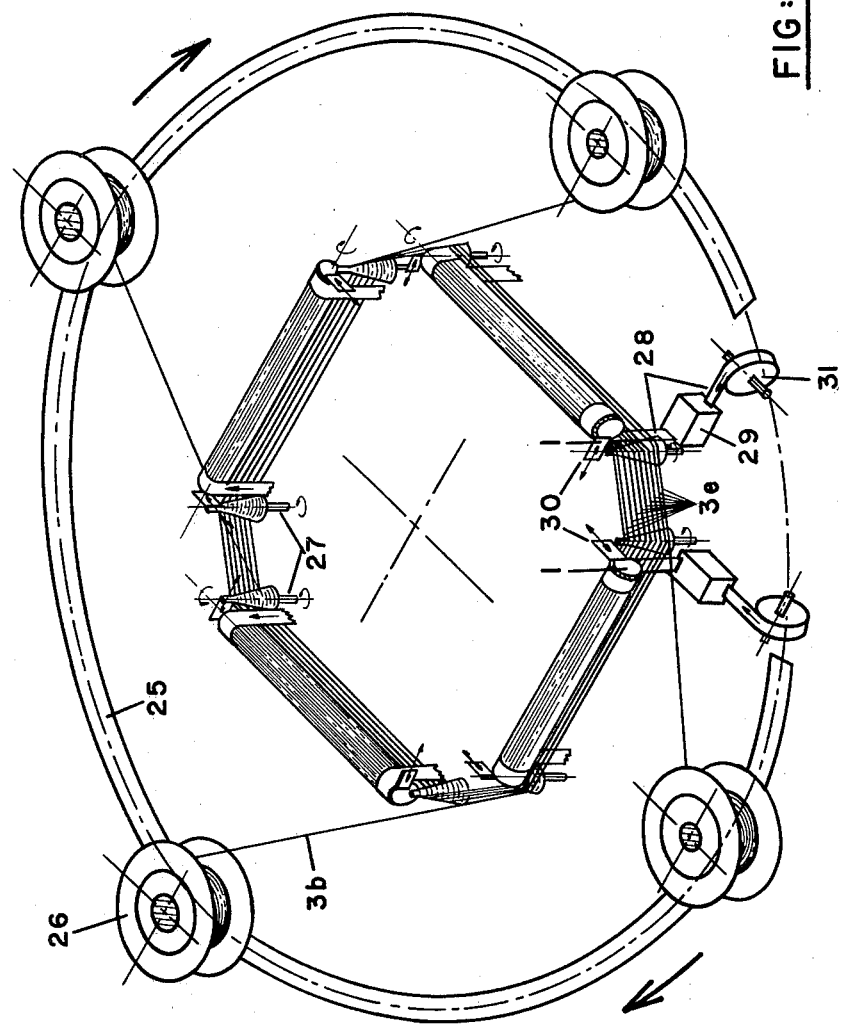
FIG: 6

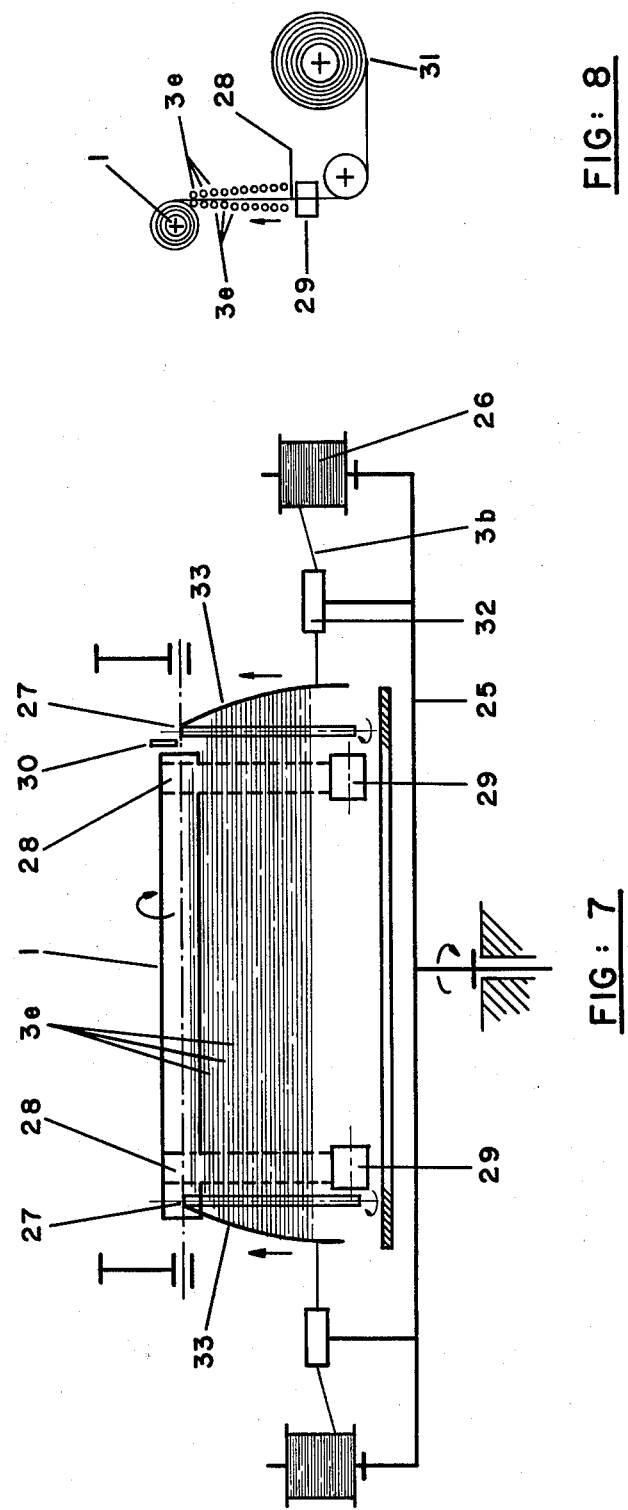

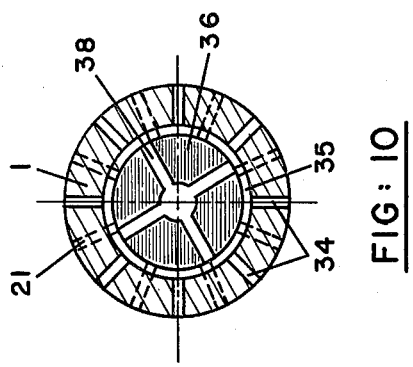
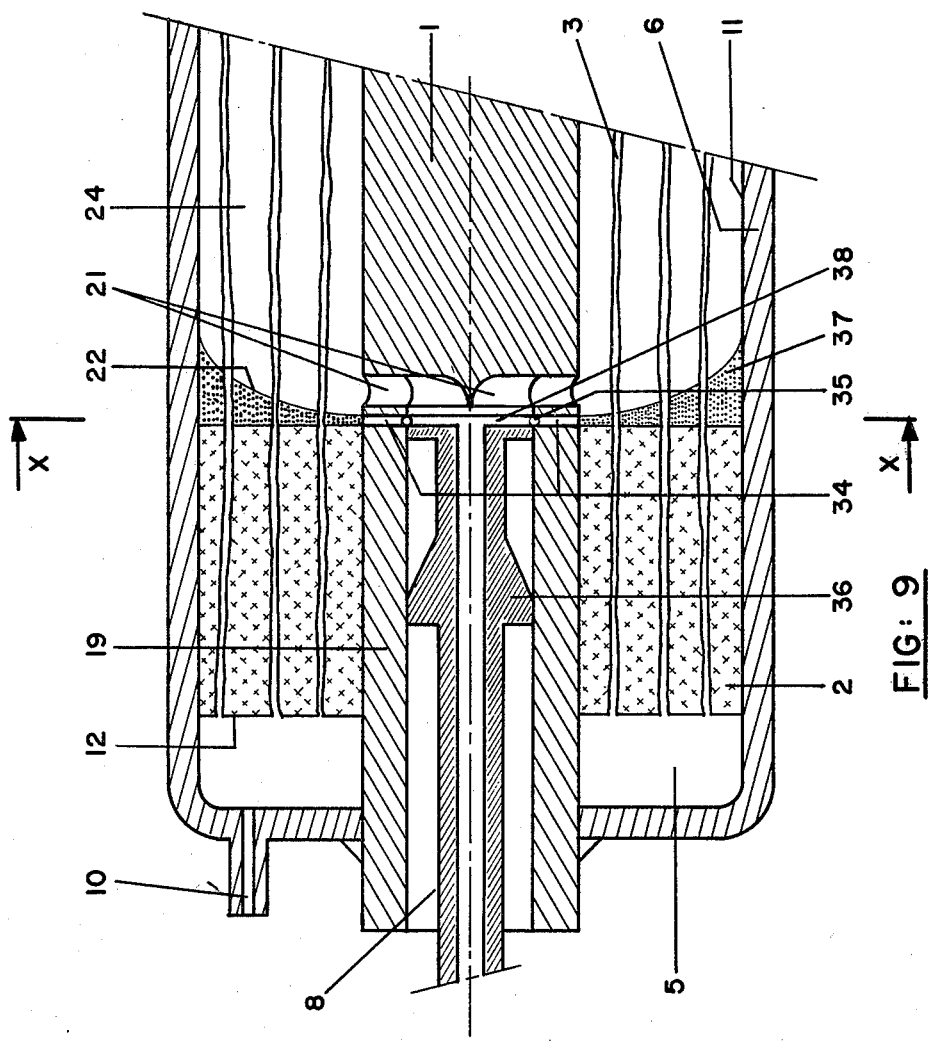

HOLLOW FIBRE APPARATUS

The present invention relates to a hollow fibre apparatus, which can be used for the fractionation of fluids, especially for the treatment of blood. In the latter case, the blood can advantageously circulate about the outer walls of the fibres. The present invention also relates to a process, and equipment, for the production of the apparatus according to the invention.

Apparatus of the prior art comprises hollow fibres, located between spaced sealing elements. In such apparatus, the opposite inner sides of the sealing elements are generally perpendicular to the longitudinal axis of the device. This arrangement does not favour the removal of gas from the chamber comprising the hollow fibres, when a liquid is circulated outside the hollow fibres from one sealing element to the other, particularly when this liquid is blood. Furthermore, such arrangement does not achieve efficient irrigation of the outer walls of the hollow fibres, particularly in regions of the opposite inner sides of the sealing elements.

One aim of the present invention is therefore to provide an apparatus which minimises the disadvantages of the hollow fibre apparatuses of the prior art.

A hollow fibre apparatus has now been found, and it is to this which the present invention relates, which can be used for the fractionation of fluids, especially for the treatment of blood with the circulation of the latter outside the fibres, which comprises, a mandrel towards the ends of which two sealing elements are situated which surround the said mandrel and by which the hollow fibres are held, the fibres extending from one sealing element to the other, at least one of these sealing elements being traversed by the hollow fibres so that open ends thereof are exposed at an outer side thereof and having an inner side opposite to the inner side of the other sealing element which is inclined at least in part with respect to the longitudinal axis of the mandrel, a casing which is arranged at least around the hollow fibres and the sealing elements and which defines, between its inner wall, the inner sides of the sealing elements and the mandrel, a chamber in which the hollow fibres are arranged, first inlet and/or outlet means for introducing and/or withdrawing fluid which is circulated inside the hollow fibres, and second inlet and outlet means for introducing and withdrawing of fluid which is circulated outside the fibres inside the chamber.

The term "fractionation", which has been used above, encompasses any exchange or transfer of matter (or even of calories) by which, after the said fractionation has taken place, one or several fluids are obtained which do not have the same composition nor the same properties as the fluid which was introduced into the hollow fibre apparatus. The fractionation operations which are envisaged are therefore essentially:

exchange operations (dialysis, for example artificial kidney, direct osmosis, gas-gas exchange, gas-liquid exchange, for example artificial lung), separation operations (ultrafiltration, reverse osmosis, gas permeation), and even mixing operations.

But the hollow fibre apparatus according to the present invention can also be used in operations such as heat exchange between two fluids, the humidification or conditioning of air, and the dissolution of gases in liquids.

In the apparatus according to the present invention, the expression "hollow fibres" denotes fibres of tubular shape, that is to say fibres inside which there is a continuous canal which is arranged essentially along the axis of the fibre. The hollow fibres which can be used can be of any known type and be made of any natural, artificial or synthetic macromolecular material. In particular, the fibres which are described in French Pat. Nos. 1,307,979, 1,586,563, 2,017,387 and U.S. Pat. No. 3,674,628 can be used. These fibres can be obtained by a melt process, by a dry process (evaporation of solvent) or by a wet process (coagulation). The precise nature of the hollow fibres is chosen as a function of the application which is envisaged and naturally, for operations of simple heat exchange, the hollow fibres used will be impermeable to the fluids which circulate about their outer or inner walls and will be made of materials such as those described especially in U.S. Pat. No. 3,315,740.

The fibres which can be used in the apparatus according to the present invention have an external diameter which is generally less than 1.5 mm, preferably less than 0.75 mm and generally greater than 5 microns. When the apparatus is used as a haemodialyser or as an artificial lung, the external diameter of the fibres is preferably greater than 300 mircons. The thickness of the wall of the fibres is generally between 1 and 100 microns.

The description of the apparatus according to the present invention, as well as of the processes and equipment for its operation, will be better understood with the aid of the attached figures, which illustrate schematically, by way of non-limiting examples and without a fixed scale, particular embodiments of the said apparatus as well as of the processes and equipment for its production.

FIGS. 1 and 2 show longitudinal cross-sections of two embodiments of apparatuses of the invention, each one of them having a sealing element which is inclined with respect to the longitudinal axis of a mandrel.

FIGS. 3 and 4 show longitudinal cross-sections of two other embodiments of apparatuses of the invention, each one of them having its two sealing elements inclined with respect to the longitudinal axis of the mandrel.

FIG. 5 is a transverse cross-section of the mandrel along V—V in FIG. 2.

FIG. 6 shows equipment suitable for the production of a hollow fibre apparatus with at least one sealing element inclined with respect to the longitudinal axis of the mandrel.

FIGS. 7 and 8 show variants of the equipment according to FIG. 6.

FIGS. 9 and 10 respectively show a partial longitudinal cross-section and a cross-section at X—X of FIG. 9 of sealing element in an apparatus of the invention.

FIG. 1 shows an apparatus according to the present invention which comprises a cylindrical mandrel (1), which is advantageously of circular transverse cross-section, and towards the ends (19 and 20) of which two so-called sealing elements (2) are situated, which sealing elements surround the said mandrel and by which the hollow fibres (3) are held, the said fibres (3) extending from one sealing element to the other and being open at their ends. The hollow fibres (3) can be approximately parallel to each other and to the longitudinal axis of the mandrel. The fibres may be separated by ribbons or threads which are preferably solid and which are wound around the mandrel; as is described in French Pat. Nos. 1,455,991 or 2,126,208. However, the hollow fibres can advantageously be arranged in the shape of torsades of two fibres or torsades which themselves each comprise two torsades of two hollow fibres. Hollow fibre torsades of this type are described in French Pat. Nos. 73/20,040 and 74/11,674. Each end of the fibres (3) is open and opens out into a compartment (4) or (5) which comprises means (9, 10) for the introduction and/or the discharge of the fluid which is circulated inside the hollow fibres (3). Around the assembly "mandrel (1)+sealing elements (2)+hollow fibres (3)" a casing (6) is situated which comprises, at one of these ends, means which delimit one of the compartments and, at the other end, an applied cheek (16). The casing (6) can optionally comprise an applied cheek (16) at each end. The inner wall (11) of the casing (6), the mandrel (1) and the opposite inner sides (22 and 23) of the sealing elements (2) define a chamber (24) of annular (or approximately annular) cross-section, inside which the hollow fibres are situated. When the latter (3) are in the form of torsades, they are generally in direct contact with the inner wall (11) of the casing (6). The particular characteristic of the apparatus according to FIG. 1 lies in the fact that one of the two sealing elements (2) has its inner side (22) at the chamber (24) inclined with respect to the longitudinal axis of the mandrel. In general, the outer side (12), which is opposite the side inclined with respect to the axis of the mandrel is also inclined and the inclinations are generally the same. However, the side (12) can optionally be perpendicular to the longitudinal axis of the mandrel. In the apparatus according to FIG. 1, and in the hollow fibre apparatuses in the following figures, which will be mentioned below, any inner side of a sealing element at the chamber (24), which face is inclined with respect to the longitudinal axis of the mandrel, has an inclination which is approximately the same in any plane which contains the longitudinal axis of the mandrel for any point on this side, which point is situated either equidistant from this longitudinal axis, in the case where the transverse cross-section of the mandrel is circular towards its ends (19 and 20) which support the said sealing elements (2), or equidistant from the periphery of the mandrel towards its ends (19) and (20), in the case where the mandrel is not of circular cross-section at these points.

In the case of the apparatus according to FIG. 1, the intersection of a plane containing the longitudinal axis of the mandrel with the inclined inner side (22) of the sealing element (2) is shown by two segments of straight lines on both sides of the mandrel (1). These segments of straight lines can be considered as making an acute angle with the longitudinal axis of the mandrel, when measuring this angle from inside the chamber (24). This angle is generally between 20 and 88 degrees and advantageously between 30 and 70 degrees. The sealing elements (2), which hold the fibres (3), generally comprise solidified glue and at least the sealing element (2), of which the inner side (22) is inclined, advantageously comprises a ribbon which is wound in a spiral around the mandrel (1), the hollow fibres (3) being arranged with the glue between the turns of this ribbon. Glues based on epoxy resin, polyurethane resin or silicone resin can be mentioned as examples of glues which can be used to form the sealing elements. The thickness of the ribbon used is generally between 0.005 and 2 mm and preferably between 0.05 and 0.5 mm. The width of the ribbons is in general less than 5 cm, and preferably less than 3 cm. These ribbons can be made of a synthetic material, such as the polyamides and the polyesters, or of a natural material, such as cotton for example. These ribbons can be films, and can be braided, knitted, woven or non-woven, or extruded and can have a large number of small holes. These ribbons can also be made of materials which conduct electricity or comprise such materials, especially on at least one of their faces, it being possible for these materials to be metallic for example; this embodiment of the ribbons is particularly valuable when the latter are covered with a solid glue (of the "hot-melt" type) at ordinary temperature, because they make it possible to melt this glue, for example by means of Foucault currents, just before they are wound around the ends of the mandrel. It should be noted, by way of a variant, that the element (2), the inner side (22) of which is inclined with respect to the longitudinal axis of the mandrel, can optionally comprise, in the place of a ribbon which is wound in a spiral around the mandrel (1), threads which are essentially parallel to each other and are wound in a spiral around the said mandrel, the hollow fibres then being arranged between the turns of these threads. Near the inclined side (22) of the sealing element (2), canals (21), the axis of which is essentially parallel to the inclination of the side (22) of the inclined sealing element, are arranged around and in the mandrel, these canals (21) being joined to a distribution system (8) which is generally in the axis of the mandrel (1).

When using the apparatus according to FIG. 1, for example as a haemodialyser, the blood is advantageously caused to arrive through the distribution system (7), the blood circulates inside the chamber (24) on the outer wall of the hollow fibres (3) and it then leaves the apparatus through the canals (21) and the distribution system (8). The dialysis liquid enters the apparatus through the neck (10), passes into the compartment (5), circulates in the hollow fibres over their whole length, flows out of the fibres into the compartment (4) and then leaves the apparatus through the neck (9). By convention, which is preserved throughout the description and for each figure which shows a hollow fibre apparatus, the arrows near each distribution system or neck have two chevrons when they indicate the direction of circulation of the fluid outside the hollow fibres, whereas these arrows have one chevron when they indicate the direction of circulation of a fluid inside the fibres.

The apparatuses according to FIGS. 2, 3 and 4 are other embodiments of the hollow fibre apparatus according to FIG. 1. FIG. 2 thus shows an apparatus in which all the elements of the apparatus according to FIG. 1 are to be found, but in which the mandrel (1) is in the shape of a truncated cone between its two ends (19 and 20) which are advantageously cylindrical and which support the two sealing elements (2). In this apparatus according to FIG. 2, the inner wall (11) of the casing is similarly in the shape of a truncated cone at least along the greater part of its length which is opposite the part, which is in the shape of a truncated cone, of the mandrel (1). The conicities of the mandrel (1) and the inner wall (11) of the casing (6) are advantageously slightly different (that of the inner wall of the casing being smaller) and are such that a cross-section of the passage for the fibres (3) is kept essentially the same over the greater part of the length, which is in the shape of a truncated cone, of the mandrel. The conicity of the mandrel (angle at the vertex) is advantageously between 2 and 100 degrees. In the case of relatively long apparatuses (for example of 15 cm or more), the conicity of the mandrel (angle at the vertex) is generally between 2 and 15 degrees and preferably between 4 and 10 degrees. This embodiment of the apparatus has the advantage of favouring the positioning of the casing (6) around the assembly "mandrel (1)+hollow fibres (3)+sealing elements (2)". In fact, when the apparatus is being set up, the contact between the hollow fibres (3) and the inner wall (11) of the casing (6) is only made over a short distance when the mandrel (1) or the casing (6) slides over the fibres, by virtue of their relative conicity, and this applies especially when the hollow fibres (3) are in the shape of torsades; this avoids damaging the fibres. On the other hand, the fact that with this apparatus any transverse cross-section of the chamber (24) has essentially the same surface area over approximately the whole length of the said chamber (24) and that, in addition, the casing can optionally be arranged around the fibres, at constant pressure, makes it possible to reduce as much as possible the preferential routes between the inner wall (11), which is in the shape of a truncated cone, of the casing (6) and the hollow fibres which are in contact with it, as well as between the hollow fibres themselves. In the apparatus according to FIG. 2, the distribution system (7), through which the fluid which circulates on the outer wall of the fibres is caused to arrive in the chamber (24), advantageously opens out onto the inner wall of the casing, whilst the inner wall has a larger cross-section at this point represented by (13) in FIG. 2; this favours the distribution and the dividing up of this fluid. This distribution system (7) can advantageously open out tangentially into the part represented by (13) of the chamber (24) and can thus be arranged tangentially with respect to the casing (6). The canals (21) which are near the inclined side (22) of the sealing element (2) are essentially radial with respect to the longitudinal axis of the mandrel (1). FIG. 5, which is a transverse cross-section of the mandrel (1) along V—V in FIG. 2, shows how the canals (8) can be distributed around the mandrel and open out into the chamber (24), for example into a groove (14) which is provided around the mandrel (1). In the appratus according to FIG. 2, the sealing elements (2) are sealed to the inner wall of the casing (6) by an extra injection (17) of glue, which is carried out from the casing by means of openings (18) which are regularly distributed across the casing (6), for example in a plane which is essentially perpendicular to the axis of the casing, towards each sealing element.

By way of a variant of the apparatuses according to FIGS. 1 or 2, it must be indicated that the intersection of a plane, which contains the longitudinal axis of the mandrel, with the inclined side (22) of the element (2) is not necessarily shown by two segments of straight lines on both sides of the mandrel, but that this intersection can optionally be shown by two segments of curves, which are arranged essentially symmetrically with respect to the longitudinal axis of the maandrel. One example of a sealing wall of this type is shown by the face (23) of the apparatus according to FIG. 3, which is better described below. The inclination of the side of a sealing element with respect to the longitudinal axis of the mandrel generally decreases with increasing distance from support means for support of this sealing element, in a general case, or with increasing distance from the longitudinal axis of the mandrel, in the case where the transverse cross-section of the mandrel is circular. The angle of the side of a sealing element of this type with any plane which contains the longitudinal axis of the mandrel can thus vary and be between 90 degrees (near the mandrel) and approximately 1 degree (when this face is near the inner wall of the casing).

The apparatuses according to FIGS. 3 and 4 both possess sealing elements, the opposite sides (22 and 23) of which are inclined with respect to the longitudinal axis of the mandrel. As for the apparatuses according to FIGS. 1 and 2, which have been mentioned above, the outer side of each sealing element, of which the inner side is inclined, can have essentially the same inclination as the latter. However, this outer side can be perpendicular to the longitudinal axis of the mandrel. In the case of the apparatuses according to FIGS. 3 and 4, the outer sides (12) and (15) of each sealing element (2) each have essentially the same inclination as that of the inner side (22 or 23) in question.

With more particular reference to the apparatus according to FIG. 3, the inner side (22) of the sealing element which is situated on the left makes an obtuse angle, as measured inside the chamber (24), with the longitudinal axis of the mandrel (1), whereas the inner side (23) of the other sealing element makes an acute angle, this angle diminishing with increasing distance from the mandrel (1). The arrows near the distribution systems or necks (7, 8, 9 and 10) indicate, according to the previously stated convention, the possible directions of circulation of the different fluids. Although not shown in the apparatus according to FIG. 3, the diameter of the inner wall (11) of the casing can be wider near the neck (7), as in the apparatus according to FIG. 2, in order to favour the distribution and the dividing up of the fluid which is introduced into the chamber (24). It is also possible for the apparatus according to FIG. 3, for the mandrel (1) and the inner wall (11) of the casing (6) to be in the shape of a truncated cone and for the sealing elements (2) to be sealed to the casing by the peripheral injection of glue, as is the case for the apparatus according to FIG. 2.

The apparatus according to FIG. 4 comprises sealing elements (2) which each have their inner sides (22 and 23) at the chamber (24) inclined and making an obtuse angle with respect to the longitudinal axis of the mandrel (when measuring this angle inside the chamber 24). With this embodiment of the apparatus according to FIG. 4, the fluid which circulates outside the fibres enters the apparatus through a neck (7) which is situated on the casing and leaves the apparatus again through another neck (8) which is also situated on the casing. By way of variants, the apparatuses according to FIGS. 3 and 4 can each have a mandrel, which is in the shape of a truncated cone, between its sealing elements, and a casing, the inner wall of which is similarly in the shape of a truncated cone, as is the case for the apparatus according to FIG. 2.

Although the previously described apparatuses all comprise, at each end, a compartment (4 and 5) for the introduction and/or the discharge of fluid which is circulated inside the fibres, it is however possible for an apparatus according to the present invention to have only one compartment (4 or 5) at only one of its ends. This apparatus is therefore more particularly used for separation operations such as ultrafiltration or reverse osmosis, when the fluid to be treated circulates outside the fibres, whereas the fluid which has traversed the inside of the fibres is collected and discharged through the said compartment. In such an embodiment of the apparatus, the hollow fibres can be in the shape of a U and bent in the sealing element (2) next to which no compartment (4 or 5) need be situated. This sealing element (2) generally comprises its outer side at the chamber (24) in an arrangement which is perpendicular to the axis of the mandrel, and may or may not be leak-proof to the fluid which circulates outside the fibres (3). But on the other hand, the fibres can each have one end, for example, embedded in glue and, in this case, it is advantageously that end of the hollow fibres which is situated in a sealing element which is leak-proof to the fluid which circulates outside the fibres, this sealing element generally having its outer side perpendicular to the axis of the mandrel (1).

Although this embodiment is not shown, an apparatus according to the present invention can have its mandrel (1) perforated over the whole of its surface between the two sealing elements (2), the said mandrel being open at least at one of its ends. The presence of a sealing element, of which the inner side at the chamber (24) is inclined, favours the removal of gas from this apparatus when the latter is put into operation, and does so more especially when the mandrel of this apparatus is relatively short in comparison with the thickness of the fibres which are arranged around this mandrel.

FIG. 6 shows equipment which can be used for the production of the hollow fibre apparatus according to the present invention, of which certain embodiments have been shown in FIGS. 1 to 5. This equipment comprises a device for winding at least one hollow fibre (3b) around means which make it possible to obtain an envelope (3e) of polygonal cross-section with this fibre. This device comprises a frame (25), which rotates around its axis, with spools (26) of hollow fibres (3b). In order to simplify the drawing, the thread-guides of the spools and the means of entraining this frame (25) have not been shown. Each spool (26) has at least one hollow fibre (3b) and may optionally have several; in this case, the fibres are then advantageously in the shape of torsades. The frame (25) has been shown with four spools (26) but it can have only one or two. The means which make it possible to obtain an envelope (3e) of polygonal cross-section with the fibres (3b) comprise rods (27) which are at least partially threaded, are arranged at each end of the mandrels (1) and on the threaded part of which the hollow fibres (3b) are deposited. These rods (27) can rotate on themselves around their longitudinal axis by virtue of means of entraining which are not shown. The rods (27) advantageously have a profile (or a positioning) such as to make it possible for the fibres of the envelope of polygonal cross-section to slacken in the course of their forward movement onto the said rods (27), this avoiding a subsequent contraction of the hollow fibres, especially after they have been sectioned. The rods (27) can in addition have a profile such that the envelope (3e) of hollow fibres can take up the longitudinal profile of each mandrel (1), when it comes into contact with the latter. The equipment according to FIG. 6 comprises eight threaded rods (27) and four mandrels (1), which are shown in the situation when the desired number of hollow fibres around each one of them has almost been reached. The longitudinal axes of the mandrels (1) are in the same plane which is perpendicular to the axis of rotation of the frame (25). The apparatus according to FIG. 6 comprises means of holding the envelope (3e) of hollow fibres before it is sectioned. These means are advantageously ribbons (28) which are arranged towards each end of the mandrel (of which the inner face of the sealing element is inclined), which are covered with an adhesive material at least over part of their width by passing them through glue distributing troughs (29), and are wound around the mandrels (1). If the hollow fibre apparatus possesses a single inner face at the chamber, which is inclined with respect to the longitudinal axis of the mandrel (case of the apparatuses according to FIGS. 1 and 2) the sealing element, of which the inner side is not inclined, can optionally be obtained not by winding a ribbon around the mandrel but by winding, for example, solid threads which are essentially parallel to each other and which hold the envelope (3e) of hollow fibres before it its sectioned. In order to maintain the point of contact between the ribbons (28) (or optionally between the threads in the case of a sealing element of which the inner side is not inclined) and the mandrels (1), which rotate around their longitudinal axis while being covered with lengths of hollow fibres (3), always in essentially the same place (as will be described in detail below), the apparatus can comprise means, which are not shown, either of increasing the distance in a controlled manner of each mandrel (1) from the rods (27) which are then fixed or, on the contrary, of increasing the distance in a controlled manner of the rods (27) from the mandrels (1) which are then fixed.

The equipment according to FIG. 6 comprises means (30) of sectioning the envelope (3e) of hollow fibres whilst the latter is held on the mandrel (1) by the ribbons (28). These means (30) of sectioning are advantageously situated near the point of contact of the ribbons (28) with the mandrel, towards each end of the mandrels (1). These means of sectioning (30) the envelope can, for example, consist of rotating circulating blades.

In order to produce each inclined side which is inner at the chamber (24), of a sealing element (2) which has been mentioned above for the apparatuses according to FIGS. 1 to 5, the equipment according to FIG. 6 comprises means, which are not shown, of displacing in a controlled manner the spools (31) of ribbons (28), the ribbons (28) and the glue distributing troughs (29), either towards the central part (with respect to its length) of each mandrel (1), in the case of an inclined side which makes an acute angle with respect to the longitudinal axis of the mandrel, or towards (or beyond) the end of the mandrel, in the case where the inclined side of the element (2) makes an obtuse angle with respect to the longitudinal axis of the mandrel (1). The means (30) of sectioning the envelope (3e) can optionally be displaced in the same direction and in the same movement as that of the ribbons (28), for each sealing element (2) having an inclined side which is inner at the chamber (24).

The operation of the equipment shown in FIG. 6 is carried out in the following manner: after passage through a glue distributing trough (29), each ribbon (28) is attached to one end of a mandrel (1), the end of each fibre (3b), which is wound off from a spool (26), is attached to a fixed point on the equipment, after having passed this fibre into a thread-guide (the latter, as well as the fixed point which is mentioned above, not being shown), the mandrels (1), the frame (25) and the rods (27) are caused to rotate around their axes and the means (30) of sectioning the envelope are put into operation, in order to produce each sealing element (2) of which the inner side is inclined with respect to the longitudinal axis of the mandrel, the means which make it possible to displace the ribbons (28) in a controlled manner are set in motion, as the ribbons wind around the mandrel.

The means, which make it possible to displace the means (30) of sectioning near each element (2) of which the inner face at the chamber (24) is inclined, are optionally set in motion.

When the envelope (3e) of hollow fibres comes into contact with the means (30) of sectioning, four groups of lengths of hollow fibres (3) are obtained, of which each group is wound around the corresponding mandrel.

The ribbons (31) are sectioned when the thickness (or the number) of hollow fibres around the mandrels (1) is judged to be sufficient. When the mandrels (1) which are surrounded by hollow fibres (3) have been removed, the operation can be restarted with other mandrels.

For each end wall of which the inner face at the chamber (24) is inclined with respect to the longitudinal axis of the mandrel, it is advantageous to hold the ribbon (28), at the beginning of its winding process around the mandrel, for example with an open elastic ring which makes it possible to grip the ribbon in a groove which is especially provided around the mandrel.

The equipment according to FIG. 6 makes it possible to vary, at will and independently of each other, the rotation speeds of the frame (25), the rods (27) and the mandrels (1). This is particularly important and advantageous, especially at the end of the winding of the lengths of hollow fibres (3) around a mandrel (1). Thus, the rotations speeds of the frame (25) and the rods (27) can be reduced as much as possible and the rotation speed of the mandrels (1) can be increased in order to terminate the winding by a few turns of ribbons (28) without lengths of fibres (3). This equipment is also easily adapted for high extensive automation with the possibility of programming the rotation speeds of the frame (25), the rods (27) and the mandrels (1), it even being possible to carry out the changing of mandrels automatically.

Numerous variants of the above equipment, shown in FIG. 6, will be apparent to those skilled in the art. Instead of comprising one threaded rod (27) at each end of each mandrel (1), the equipment can comprise only a single rod (27) between two consecutive mandrels (1).

It is also possible to wind around each mandrel (1), between the ribbons (28) of the end walls (2), spacer threads or ribbons which are spaced out from each other with the aim of ensuring a better circulation and distribution of fluid which is to circulate outside the lengths of hollow fibres (3), especially when the fibres (3) are not in the shape of torsades.

By way of a variant, it is possible to use threaded rods (27), which are positioned in the same way as those of the equipment according to FIG. 10 but are cylindrical over their whole length, and to provide a device or "ramp", which is positioned between each group of two adjacent consecutive rods (27). This ramp is positioned (or has a profile which is chosen) in such a way that it can make it possible for the fibres of the polygonal envelope (3e) to slacken in the course of their forward movement onto the threaded rods and onto the ramps. When the mandrels have a longitudinal profile with, for example, a large decrease in transverse cross-section near their ends, the above ramp can have a profile which is such that it can make it possible for the fibres of the envelope (3e) to take up the particular profile of the mandrels when the fibres come into contact with them.

By way of a non-preferential variant of the equipment according to FIG. 6, it is possible to produce equipment in which the rods (27) are replaced, between each end of the mandrels, by a belt system which rotates around two pullies, the hollow fibres (3b) then being deposited onto one side of the belt. Thus, the envelope (3e) of hollow fibres is then formed by deposition of hollow fibres onto one of the two sides of each belt which is rotating around two pullies and is arranged at each corner of the envelope of hollow fibres.

In the apparatus according to FIG. 6, each rod (27) can furthermore be replaced by two adjacent elements, of which the movement of one with respect to the other is analogous to the movement of the elements for entraining materials under "the gab-hook" of a sewing machine. The hollow fibres (3b) are thus deposited (by winding) onto the elements, which are mentioned above, and move forward onto the latter by means of their relative movement of the one with respect to the other.

More particularly, as far as the means are concerned which make it possible to displace the ribbons (28) as they are being wound around a mandrel, these means comprise, for example, a cam control, the rotation of which is advantageously synchronised with the rotation of the mandrel, or a rod-and-slide control which is actuated by a tapping of the relative spacing control of the threaded rods with respect to the mandrels.

By way of a variant, it must be noted that, although it has been stated above that the means which make it possible to hold the envelope (3e) of hollow fibres are advantageously ribbons (28) when one sealing element has its inner side at the chamber (24) inclined with respect to the longitudinal axis of the mandrel (1), these means can optionally comprise (in place of the ribbons) threads which are generally solid and essentially parallel to each other, it being possible for these threads to be very close to each other and to pass through a glue distributing trough before they are wound around the end (or the ends) of the mandrel. Each sealing element, of which the inner side at the chamber is inclined with respect to the longitudinal axis of the mandrel, thus comprises glue and threads, in the turns of which the hollow fibres (3) are arranged.

When it is desired to obtain a hollow fibre apparatus according to the present invention with the fibres arranged in the shape of a U along the mandrel (1), that is to say with their open ends joined together on a single leak-proof end wall, it is possible to use the equipment according to FIGS. 7 and 8, which has all the essential elements of the equipment according to FIG. 6. This equipment according to FIGS. 7 and 8 comprises only two threaded rods (27) which are approximately tangential to the mandrel, these rods being cylindrical in the case of the figure, and it comprises two ramps (33) which are situated essentially in the plane which passes through the axis of the two threaded rods (27), these ramps having the function of allowing the envelope (3e) of hollow fibres to be able to slacken in the course of its forward movement onto the rods (27) and the ramps (33) and optionally to take up the longitudinal profile of the mandrel when the envelope (3e) comes into contact with it. Thus, with equipment according to FIGS. 7 and 8, the hollow fibres (3b), which come from the spools (26) and pass through the thread-guides (32), are deposited onto the threaded rods (27) and the ramps (33), to form an envelope (3e) of hollow fibres by rotation of the frame (25). This envelope (3e) then turns towards the mandrel (1) in the direction indicated by the arrows and is wound around the said mandrel (1), this envelope (3e)

of hollow fibres being held around the latter by means of the ribbons (28) which pass through the sizing troughs (29). As shown in FIG. 8, these ribbons (28) can pass inside the envelope (3e) of hollow fibres. At the end of the mandrel (1) where the hollow fibres are open, the envelope (3e) can be sectioned, as it is wound around the mandrel, by virtue of sectioning (30) which are provided at this point. However, it is possible with this apparatus to cut the envelope only after the desired total number of fibres has been wound around the mandrel.

The equipment according to FIGS. 7 and 8, as that according to FIG. 6, comprises means, which are not shown, of displacing the ribbons (28), the glue distributing troughs (29) and the spools (31) of ribbon, which means are near each end of the mandrel which has a sealing element (2) of which the inner side at the chamber (24) is inclined.

By way of a variant, the equipment according to FIGS. 7 and 8 can have only one ramp (33). The equipment according to FIGS. 7 and 8 may optionally comprise no ramp (33) and have rods which are at least partially threaded at the point where the hollow fibres (3b) which come from the spools (26) are deposited, the said rods having a profile such as to make it possible for the envelope (3e) of fibres to slacken in the course of its forward movement onto the said rods. In another embodiment, the equipment according to FIGS. 7 and 8 may have no ramps (33), while still having screws (27) which are cylindrical and threaded over their whole length; these screws are then advantageously positioned such that their longitudinal axes verge slightly in the direction of the mandrel, this making it possible for the envelope (3e) of fibres to slacken when it approaches the mandrel.

By way of a variant and in the same way as for the equipment according to FIG. 6, the equipment according to FIGS. 7 and 8 can comprise, in place of the ribbons (28), threads which are generally solid and essentially parallel to each other, it being possible for these threads to be very close to each other and to pass through a sizing trough before being wound around each end of the mandrel. Each end wall of a mandrel thus comprises glue and threads in the turns of which the hollow fibres are arranged.

Another process for obtaining a hollow fibre apparatus, of which the inner side at the chamber (24) is inclined with respect to the longitudinal axis of the mandrel (1) for at least one sealing element (2) whereas the outer side at the chamber is perpendicular to this same axis, can be carried out, for example, by means of the device which is partially shown in FIGS. 9 and 10.

The production of the inclined inner side (22) is carried out in the following manner:

a hollow fibre apparatus is taken, which is equipped with a casing (6) of which the sealing element (2) which holds the hollow fibres (3) has already been produced, it being possible for this element (2) to already be leakproof or, on the contrary, not to be leak-proof and to comprise, for example, only one ribbon or threads which hold the fibres (3). The mandrel is equipped with holes (34) which advantageously open out into a throat (35) which is provided inside the distribution system (8) which is used to circulate the fluid outside the hollow fibres (3). These holes (34), which are advantageously distributed around the mandrel, are closer to the element (2) than are the canals (21), as is clearly shown in FIG. 9.

The assembly of the previously described hollow fibre apparatus is caused to rotate around its longitudinal axis and a controlled amount of, for example, glue (37) is injected through the holes (34), the glue being introduced into the holes (34) by means of the injection device (36), which is partially shown and is introduced into the distribution system (8). This device (6) comprises, at its end, means (38) which make it possible for the glue to reach the holes (34) of the mandrel (1).

When the desired quantity of glue has been injected (for example by means of a piston which is not shown), the rotation speed of the apparatus can be reduced and the device (36) can be removed from the distribution system (8).

The apparatus can then be left to rotate until the amount of glue injected has begun to harden.

The rotation of the apparatus around the longitudinal axis of the mandrel distributes the injected glue (37) in such a way that the latter gives an inclined side (22) which is curved and which renders the element (2) leak-proof to the fluid which circulates in the chamber (24), the seal being produced at the same time between the element (2) and the casing (6).

The axis of the mandrel (1) can be horizontal or advantageously vertical during the centrifuging operation of the injected glue.

Furthermore, this potting compound (37) can have other functions; it can especially favour haemocompatibility and/or possibly cause heparin to separate out.

We claim:

1. Hollow fibre apparatus for the fractionation of fluids which comprises,
    a mandrel towards the ends of which two sealing elements are situated which surround the said mandrel and by which the hollow fibres are held, the fibres extending from one sealing element to the other, at least one of these sealing elements being traversed by the hollow fibres so that open ends thereof are exposed at an outer side thereof and having an inner side opposite to the inner side of the other sealing element which is inclineded at least in part with respect to the longitudinal axis of the mandrel, the said at least one sealing element with an inner side inclined comprising a ribbon means enrolled around the said mandrel, the end part of the fibres being held in a leaktight manner between the spirals of the ribbon means,
    a casing which is arranged at least around the hollow fibres and the sealing elements and which defines, between its inner wall, the inner sides of the sealing elements and the mandrel, a chamber in which the hollow fibres are arranged,
    first inlet and/or outlet means for introducing and/or withdrawing fluid which is circulated inside the hollow fibres, and second inlet and outlet means for introducing and withdrawing of fluid which is circulated outside the fibres inside the chamber.

2. Apparatus according to claim 1, in which one of the second inlet and second outlet means is located at the outer wall of the casing adjacent an inner side of a sealing element.

3. Apparatus according to claim 1, in which the inclination of the inner side of the sealing element is essentially the same in any plane which contains the longitudinal axis of the mandrel for any point on said inner side which is equidistant from support means which are provided for supporting said sealing element.

4. Apparatus according to claim 1, in which the inclination of the inner side of the sealing element with respect to the longitudinal axis of the mandrel is essentially the same in any plane which contains the longitudinal axis of the mandrel for any point on said inner side which is equidistant from said axis.

5. Apparatus according to claim 1, in which the intersection of the inclined inner side of the sealing element through any plane which contains the longitudinal axis of the mandrel gives two segments of straight lines which are symmetrical with respect to said axis.

6. Apparatus according to claim 5, in which the angle of the segments of straight lines is acute.

7. Apparatus according to claim 6, in which the acute angle is between 20 and 88 degrees.

8. Apparatus according to claim 5, in which the angle of the segments of straight lines is obtuse.

9. Apparatus according to claim 1, in which the intersection of the inclined inner side of the sealing element through any plane which contains the longitudinal axis of the mandrel comprises two portions of curves which are symmetrical with respect to said axis.

10. Apparatus according to claim 9, in which the angle of the tangent at a point of each portion of the curve with respect to the longitudinal axis of the mandrel decreases as the distance of this point increases from support means provided for supporting the sealing element.

11. Apparatus according to claim 1, in which the outer side of the sealing element having an inclined inner side is inclined at the same inclination as that of the inner side.

12. Apparatus according to claim 1, in which the outer side of the sealing element having an inclined inner side is perpendicular to the longitudinal axis of the mandrel.

13. Apparatus according to claim 1, in which the mandrel is in the shape of a truncated cone at least in the part between the two sealing elements, and in which the inner wall of the casing is similarly in the shape of a truncated cone at least in the greater part of its length which is opposite to the part of the mandrel which is in the shape of a truncated cone.

14. Apparatus according to claim 13, in which the conicities of the mandrel and of the inner wall of the casing are such that the transverse cross-section of the chamber is approximately the same over the whole length of the inner wall of the casing which is in the shape of a truncated cone.

15. Apparatus according to claim 1, in which the hollow fibres are arranged in the shape of torsades which are placed next to each other.

* * * * *